(12) United States Patent
Calamatas (10) Patent No.: US 6,175,204 B1
(45) Date of Patent: Jan. 16, 2001

(54) DYNAMIC BRAKE FOR POWER DOOR

(75) Inventor: Philip J. Calamatas, Fabreville Laval (CA)

(73) Assignee: Westinghouse Air Brake Company, Wilmerding, PA (US)

( * ) Notice: Under 35 U.S.C. 154(b), the term of this patent shall be extended for 0 days.

(21) Appl. No.: 09/200,497

(22) Filed: Nov. 25, 1998

(51) Int. Cl.$^7$ ..................................................... H02P 3/12
(52) U.S. Cl. ........................... 318/375; 318/379; 318/381
(58) Field of Search .................................... 318/757–762, 318/375–381

(56) References Cited

U.S. PATENT DOCUMENTS

| | | | |
|---|---|---|---|
| 4,816,726 | * | 3/1989 | Novis et al. ........................... 318/293 |
| 4,818,895 | * | 4/1989 | Kaufman ............................... 327/565 |
| 5,291,106 | * | 3/1994 | Murty et al. ........................... 318/375 |
| 5,402,045 | * | 3/1995 | Mori ...................................... 318/757 |
| 5,644,202 | * | 7/1997 | Toriyama et al. .................... 318/369 |
| 5,801,498 | * | 9/1998 | Kusano et al. ........................ 318/139 |
| 5,818,184 | * | 10/1998 | Kim ....................................... 318/375 |
| 5,847,533 | * | 12/1998 | Hakala et al. ........................ 318/798 |
| 5,861,724 | * | 1/1999 | Ackerson ............................... 318/376 |
| 5,898,284 | * | 4/1999 | Sasajima ............................... 318/287 |
| 5,910,715 | * | 6/1999 | Kim et al. ............................. 318/254 |
| 5,941,328 | * | 8/1999 | Lyons et al. ......................... 180/65.1 |

\* cited by examiner

*Primary Examiner*—Brian Sircus
(74) *Attorney, Agent, or Firm*—James Ray & Associates (57) ABSTRACT

The invention is a dynamic brake for a power door which is moved by an electric motor having at least two terminals. The motor is energized by a pulse width modulated door drive amplifier connected to a first power line and a second power line. The door drive amplifier has a first group of switches connecting the motor terminals to the first power line and it has a second group of switches connecting the motor terminals to the second power line. The dynamic brake has a brake control signal generator connected to receive an input signal indicative of a need to apply the dynamic brake and it has at least one output signal line connected to a control input of at least two of the switches in the first group of switches. The brake control signal generator responds to the input signal indicative of a need to apply the dynamic brake by supplying at least one control signal to the control inputs of at least two switches in the first group of switches so that the control signal(s) cause at least two switches to conduct and provide at least one dynamic brake current circuit for a braking current driven by an emf of the motor and hence dynamically braking the motor.

15 Claims, 5 Drawing Sheets

DYNAMIC BRAKE FOR POWER DOOR

CROSS-REFERENCE TO RELATED APPLICATIONS

The invention described in this patent application is closely related to the following copending patent application TRANSIT VEHICLE DOOR, Ser. No. 09/099,260 which was filed on Jun. 18, 1998. It is also related to the provisional application INTELLIGENT DOOR CONTROL UNIT, which is being filed concurrently with the present application.

The teachings of the application and provisional application cited above are hereby incorporated by reference thereto.

FIELD OF THE INVENTION

The present invention relates, in general, to braking systems for power door systems and, more particularly, the instant invention relates to braking systems for transit vehicle door systems and/or elevator doors.

BACKGROUND OF THE INVENTION

Power door systems for use on elevators, transit vehicles, etc., which are generally intended for the general public, have been well known in the art prior to the development of the present invention. Such door systems must operate in a rather challenging environment in which the safety of the public may be at stake. Additionally, these door systems are subjected to heavy usage and are generally required to operate very rapidly. Furthermore, the doors in such door systems are often quite massive and must be stopped very rapidly in the event that an obstruction is detected to avoid crushing a person in the path of a door.

An electric motor for such a power door system may be powered by a pulse width modulated H-bridge amplifier. Typically, the motor is a DC motor in which the magnetic field is provided by a permanent magnet. The H-bridge amplifier switches a voltage and current from a pair of power supply lines to the electric motor and selects the polarity of the voltage applied to the motor in order to control the direction of the torque generated by the motor.

The H-bridge amplifier typically operates in one of four modes, which are referred to in the art as "quadrants". These are:

(1) Accelerate the door(s) in the door closing direction during the first portion of a door closing stroke.
(2) Decelerate the door(s) during the final portion of a door closing stroke.
(3) Accelerate the door(s) in the door opening direction during the first portion of a door opening stroke.
(4) Decelerate the door(s) during the final portion of a door opening stroke.

These four modes of operation are generally performed in a closed loop mode. A position encoder provides one or more position signal(s) which continuously indicates the position of the door(s).

The position information is conveyed to a logical device, which may be, for example, a CPU or a programmable logic chip. This logical device generates a signal indicating the appropriate acceleration or deceleration of the door(s). The signal typically is a pulse width modulated signal which is conveyed to the control inputs of the four switching devices of the H-bridge amplifier.

In the event that the door(s) encounter an obstruction, an obstruction detection indicator sends a signal to stop the doors. Stopping the doors may be done in a closed loop mode in which the logical device which controls the motor based on signals from the position encoder sends signals to decelerate the door(s).

One difficulty with this approach is that the kinetic energy of the door(s) is regeneratively converted to electrical energy which is fed back to the power distribution line which provides power to the doors. Since it is necessary to stop the doors very quickly in the event of an obstruction, this regenerative energy is fed to the power distribution line during a very short time interval and causes a spike of voltage in the power distribution line. This may cause the entire door system to fail.

Another difficulty is that oscillations may occur, the velocity of the door(s) overshooting zero speed and changing polarity. This requires a major intervention by the logical device to damp the resulting ringing of the loop dynamics as the speed decays to zero.

Another difficulty with this approach is that it is not fail safe. If the logical device malfunctions when the door(s) are in motion, the doors will continue to move and may injure a person in their path. Likewise, if the position encoder fails, the required deceleration of the door(s) will not occur.

Another approach to the problem of absorbing the kinetic energy of the door(s) when an obstruction is detected is to short the motor through a shunt resistor so that the kinetic energy of the door(s) is absorbed as heat in the resistor. This is an open loop method which does not require functioning of the encoder or the logical device.

This approach has two principal difficulties. One is that the door(s) do not decelerate at a constant rate. The current through the resistor and the motor is proportional to the emf of the motor, which is proportional to its speed. Since the emf of the motor decreases as its speed decreases, the current and hence the motor torque decrease. The maximum allowed deceleration of the door is limited by the strength of the door drive hardware which connects the motor to the door(s), and may also be limited by electrical considerations. Since, with the shunt resistor approach, the deceleration decreases below the maximum allowed deceleration, the distance required to stop the door(s) is greater than if the maximum allowed deceleration is maintained during the stopping event. Such doors are more likely to cause harm to a person than doors which are stopped with a motor current which remains constant through most of the stopping event, because the latter doors stop in a shorter distance.

Another disadvantage of the shunt resistor approach is that if the shunt is located in the door control enclosure, its heat is generated in the enclosure and may cause overheating of the electronic components.

A further disadvantage of the shunt resistor approach is that as the motor ages, its magnetic field becomes weaker. The emf generated by an aged motor at any speed is therefore lower than when it was new. It, therefore, generates less current at any speed and the door is not decelerated as rapidly and the effect on a person in the path of the door is greater.

SUMMARY OF THE INVENTION

In one aspect, the invention is a dynamic brake for a power door which is moved by an electric motor. The motor has at least a first motor terminal and a second motor terminal and is energized by a pulse width modulated H-bridge amplifier connected to a first power line having a first voltage and a second power line having a second voltage differing from the first voltage. The H-bridge amplifier has a first switch connecting the first motor terminal to the first power line, a second switch connecting the second motor terminal to the first power line, a third switch connecting the first motor terminal to the second power line and a fourth switch connecting the second motor terminal to the second power line.

The dynamic brake has a brake control signal generator connected to receive an input signal indicative of a need to apply the dynamic brake. The brake control signal generator having at least one output signal line having a signal connection to the control input of the first switch and to the control input of the second switch. The brake control signal generator responds to the input signal indicative of a need to apply the dynamic brake by supplying at least one control signal to the control input of the first switch and to the control input of the second switch. The control signal(s) cause the first switch to be closed and the second switch to be closed so that the motor is shorted through the first switch and the second switch, thereby allowing a braking current through the motor driven by an emf of the motor and hence dynamically braking the motor.

In another aspect, the invention is a method of braking a power door which is moved by an electric motor driven by an H-bridge amplifier having four switches connected to the motor. The method consists of sending control signals to control terminals of two of the switches having electrical connection to each other and to terminals of the motor to provide a current return path to allow a braking current through the motor driven by an emf of the motor and hence dynamically braking the motor.

In an additional aspect, the invention is a dynamic brake for a power door which is moved by an electric motor having at least two terminals. The motor is energized by a pulse width modulated door drive amplifier connected to a first power line and a second power line. The door drive amplifier has a first group of switches connecting the motor terminals to the first power line and it has a second group of switches connecting the motor terminals to the second power line. The dynamic brake has a brake control signal generator connected to receive an input signal indicative of a need to apply the dynamic brake and it has at least one output signal line connected to a control input of at least two of the switches in the first group of switches. The brake control signal generator responds to the input signal indicative of a need to apply the dynamic brake by supplying at least one control signal to the control inputs of at least two switches in the first group of switches so that the control signal(s) cause at least two switches to conduct and provide at least one dynamic brake current circuit for a braking current driven by an emf of the motor and hence dynamically braking the motor.

OBJECTS OF THE INVENTION

It is therefore one of the primary objects of the present invention to provide an apparatus for stopping a power door which operates in an open loop mode and does not require a functioning position encoder.

Another object of the present invention is to provide an apparatus for stopping a power door which operates in an open loop mode and does not require a functioning logic device to process position or speed of the door.

Still another object of the present invention is to provide an apparatus for stopping a power door in substantially the shortest distance permitted by the door drive hardware.

Yet another object of the present invention is to provide an apparatus for stopping a power door which does not generate significant heat in a control cabinet for the door.

A further object of the present invention is to provide an apparatus for stopping a power door which does not tend to overshoot as the door is stopped.

It is an additional object of the present invention to provide an apparatus for stopping a power door which can function in either the door closing or the door opening direction.

Still yet another object of the present invention is to provide an apparatus for stopping a power door which limits the loads on the door drive hardware.

Yet still another object of the present invention is to provide an apparatus for stopping a power door in which the kinetic energy of the door is absorbed as heat in the motor windings.

A still further object of the present invention is to provide an apparatus for stopping a power door which does not feed electrical power back to the power distribution line which supplies power to the door.

An additional object of the present invention is to provide an apparatus for stopping a power door which does not generate a voltage spike on a power distribution line which supplies power to the door.

A further object of the present invention is to provide an apparatus for stopping a power door which prevents motion of the door after it has been stopped.

Yet another object of the present invention is to provide an apparatus for stopping a power door which provides the same door stopping current regardless of the age of the motor.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing figures for the sake of clarity and understanding of the invention.

Figure 1:
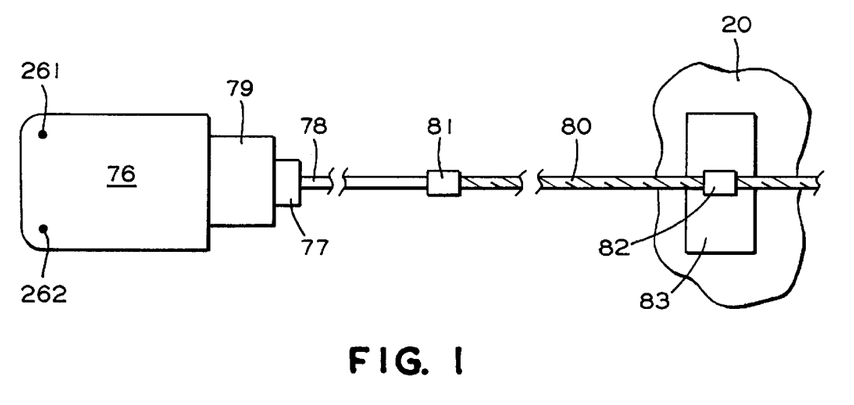
FIG. 1 is a mechanical schematic of a power door to which a presently preferred embodiment of the invention is applied.

Reference is now made, more particularly, to FIG. 1. Illustrated therein is a power door 20 which is opened and closed by a motor 76. Such motor 76 provides motive power through a transmission 79 connected to drive shaft 78 by a coupling 77. The drive shaft 78 is attached to a drive screw 80 through coupling 81. Such drive screw 80 engages a drive nut 82 that is connected to a door hanger 83 attached to door 20. Rotation of drive screw 80 causes the drive nut 82 to move along drive screw 80 and this moves such door hanger 83 and door 20.

Figure 2:
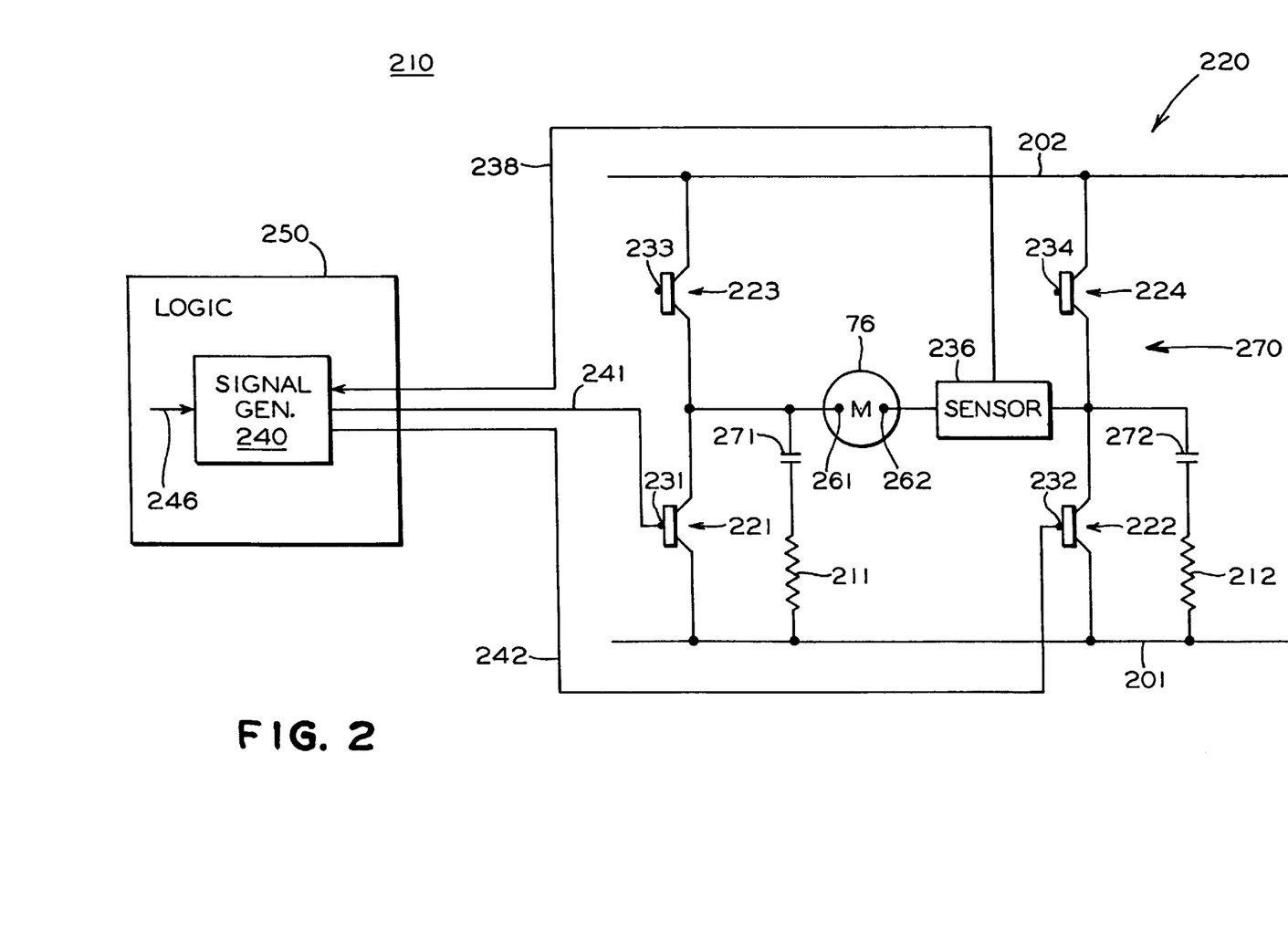
FIG. 2 is an electrical schematic of a presently preferred embodiment of the dynamic brake of the invention in which a current feedback signal is obtained from a current sensor in series with the motor.

The present invention, schematically illustrated in FIG. 2, is a dynamic brake, generally designated 210, for power door 20. In this embodiment, the motor 76 has at least a first motor terminal 261 and a second motor terminal 262. The motor 76 is energized by a pulse width modulated H-bridge amplifier, generally designated 220. H-bridge amplifier 220 is connected to a first power line 201 having a first voltage and a second power line 202 having a second voltage, the second voltage differing from the first voltage.

The H-bridge amplifier 220 includes a first switch 221 which connects the first motor terminal 261 to the first power line 201 and it includes a second switch 222 connecting the second motor terminal 262 to the first power line 201. It also has a third switch 223 connecting the first motor terminal 261 to the second power line 202 and a fourth switch 224 connecting the second motor terminal 262 to the second power line 202.

In the H-bridge amplifier 220, to which the presently preferred embodiment of the invention is adapted, first switch 221 has a first switch control terminal 231, second switch 222 has a second switch control terminal 232, third switch 223 has a third switch control terminal 233 and fourth switch 224 has a fourth switch control terminal 234. Control inputs 231, 232, 233 and 234 have signal connections (not shown) to a motor control signal generator (not shown) for causing a torque in motor 76 in either direction to open or close door 20.

The dynamic brake 210 has a brake control signal generator, generally designated 240, which preferably is disposed within a complex programmable logical device, generally designated 250. Brake control signal generator 240 includes an input signal connection 246 for receiving an input signal indicative of a need to apply the dynamic brake 210. Further, the brake control signal generator 240 has at least one output signal line 241, or 242, having a signal connection to a control terminal 231 of the first switch 221 and to a control terminal 232 of the second switch 222.

The brake control signal generator 240 responds to the input signal indicative of a need to apply the dynamic brake 210 by supplying at least one control signal to the control input 231 of the first switch 221 and to the control input 232 of the second switch 222. In this manner, the at least one control signal causes the first switch 221 to be closed and the second switch 222 to be closed so that the motor 76 is shorted through the first switch 221 and the second switch 222, thereby allowing a braking current through the motor 76 driven by an emf of the motor 76 and hence dynamically braking the motor 76.

In the presently preferred embodiment, the brake control signal applied on the signal line 241 to control input 231 of switch 221 and the brake control signal applied on signal line 242 to the control input 232 of switch 222 are pulses which are sequentially disposed in time. It is also preferred that the pulses be pulse width modulated to control a time averaged value of braking current through motor 76.

It is presently preferred that dynamic brake 210 also have at least one first capacitor 271 connected in parallel to the first switch 221 and at least one second capacitor 272 connected in parallel to the second switch 222 in order to prevent undesirable voltage spikes due to interruption of the braking current through motor 76. It is also preferred that at least one resistor 211 be placed in series with such first capacitor 271, or at least one resistor 212 be placed in series with the second capacitor 272, or both, to prevent current oscillations through first capacitor 271, second capacitor 272 and motor 76 due to interruption of the braking current through motor 76.

Figure 3:
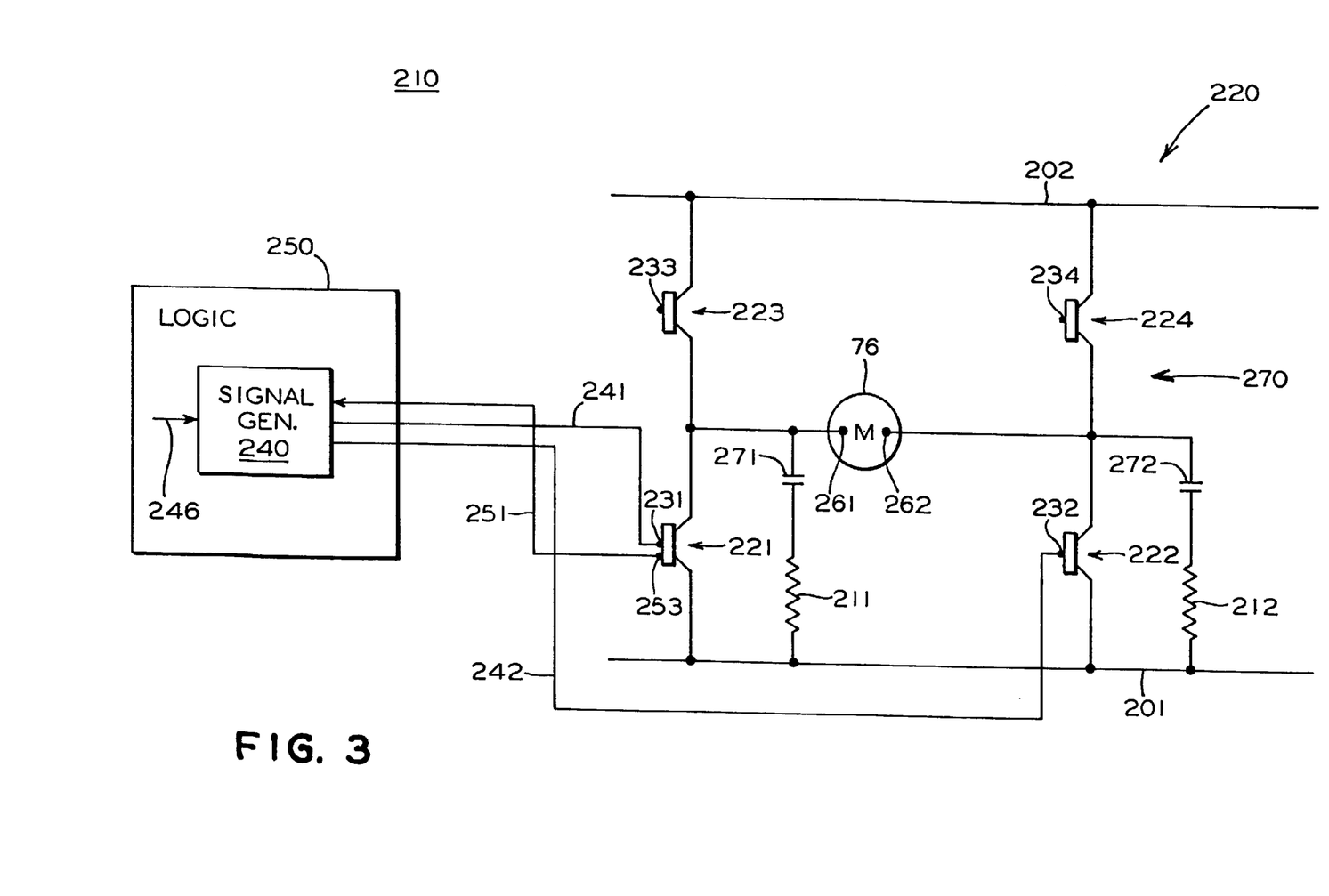
FIG. 3 is an electrical schematic of a presently preferred embodiment of the invention in which a current indicating signal is obtained from a current indicating terminal on a first transistor.

Preferably, a current sensor such as sensor 236, shown in FIG. 2, provides a current indicating signal on current feedback line 238 to the brake control signal generator 240. FIG. 3 shows an alternative configuration in which a current feedback signal is obtained on current signal line 251 from current indicating terminal 253 of switch 221.

Figure 4:
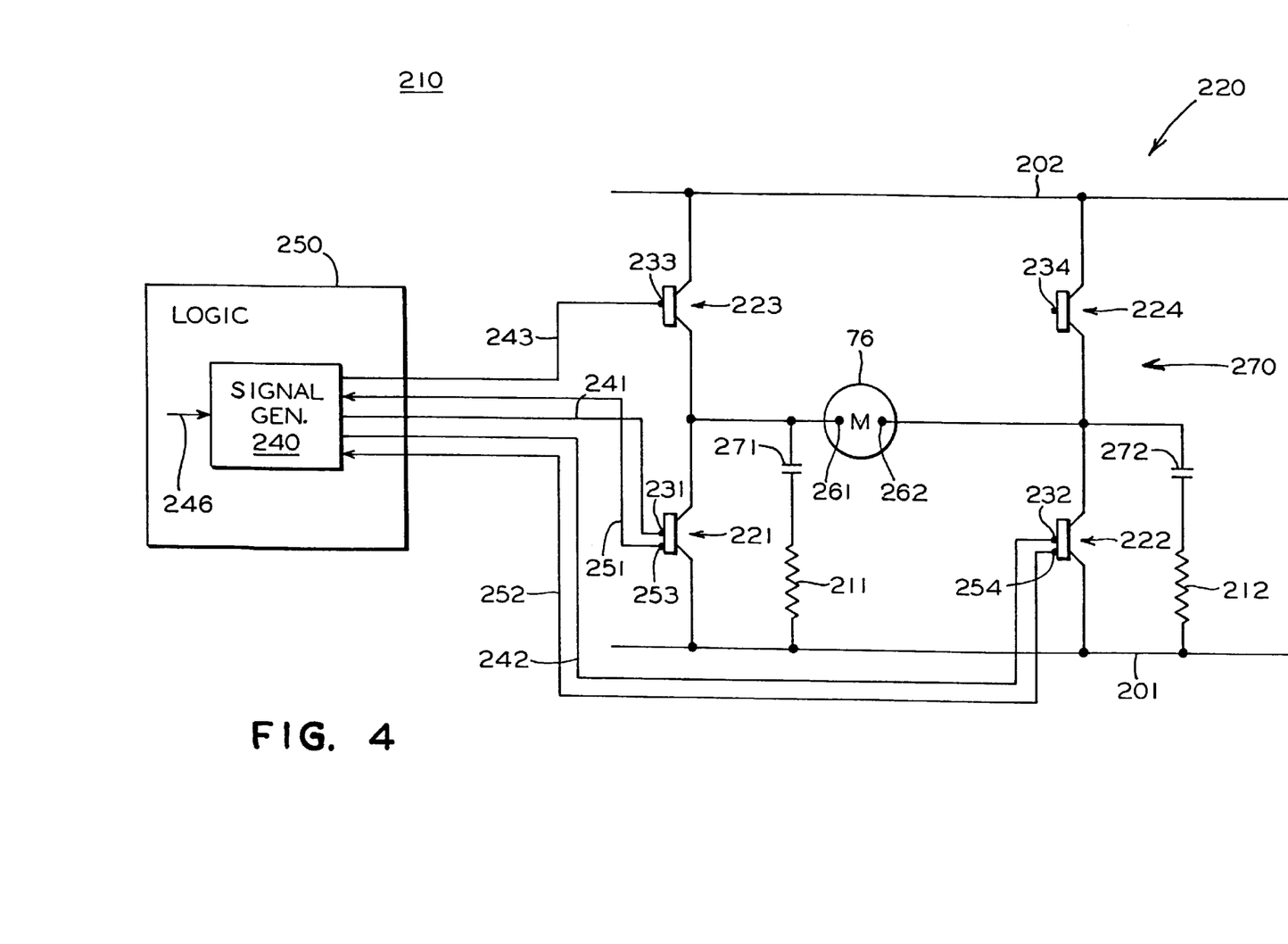
FIG. 4 is an electrical schematic of a presently preferred embodiment of the invention in which a current indicating signal is obtained from a current indicating terminal on a second transistor.

FIG. 4 shows another alternative configuration in which a current feedback signal is obtained on current signal line 252 from current indicating terminal 254 on switch 222. The current indicating signal from sensor 236, current indicating terminal 253 or current indicating terminal 254 is used to determine a time averaged current through motor 76 and adjust the width of the pulses of the brake control signals to limit the time averaged current to a predetermined current value. It is preferred that switch 221 and switch 222 be closed whenever the time averaged braking current is below the predetermined current value.

The voltage of first power line 201 may be positive relative to the voltage of second power line 202. Preferably, however, it is negative relative to the voltage of such second power line 202.

It is preferred that switch 221 and switch 222 be voltage controlled, in which case the brake control signals applied to control input 231 of switch 221 and control input 232 of switch 222 are voltage signals. Preferably, these voltage signals are pulses which are sequentially disposed in time.

Preferably, switch 221 and switch 222 are transistors and the brake control signals from brake signal generator 240 are transistor control signals. Preferably, also, such switches 221 and 222 are field effect transistors and the signals are voltage signals. In the preferred embodiment, switches 221 and 222 are metal oxide semiconductor field effect transistors and the brake control signals are voltage signals. Preferably, a current indicating signal is obtained from current indicating terminal 253 on metal oxide semiconductor field effect transistor 221, or from current indicating terminal 254 on metal oxide semiconductor field effect transistor 222.

In the presently preferred embodiment, the control signal generator 240 sends signals to both the first switch 221 and second switch 222 to close them when door 20 has been closed to provide a force opposing opening of door 20.

Figure 5:
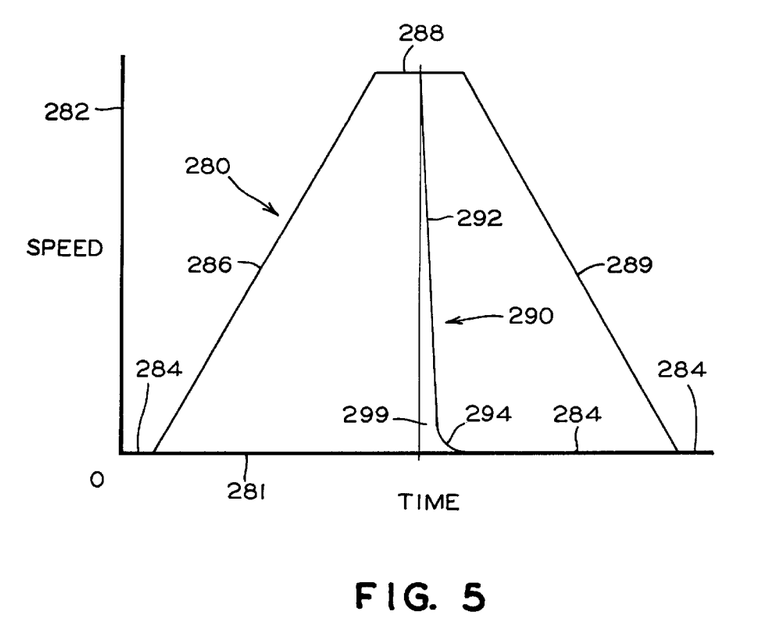
FIG. 5 is a plot of velocity versus time for a power door for a normal closing cycle and for an emergency stop with the dynamic brake of the invention.

FIG. 5 is a plot of the velocity of door 20 during a normal opening or closing stroke and the velocity during an emergency stop provided by the dynamic brake of this invention. The abscissa 281 indicates time and the ordinate 282 indicates the door speed. The velocity, generally indicated as 280, during a normal stroke starts from zero velocity 284 and accelerates at a constant rate on acceleration ramp 286. Upon reaching the maximum velocity 288 it remains at that velocity until it begins decelerating at a constant rate, following deceleration ramp 289, until it reaches the zero speed 284.

At any time during the stroke, an obstruction detection system (not shown) may send a signal for eddy current braking on signal line 246. The door 20 then decelerates rapidly following the dynamic braking curve, generally designated 290, which includes linear portion 292. Linear portion 292 corresponds to the predetermined constant time averaged current through motor 76. It should be noted that motor 76 preferably is a DC motor having a permanent magnetic field.

When motor 76 has almost stopped, its emf is insufficient to maintain the predetermined current and the velocity profile then follows terminal portion 294 of dynamic braking curve 290. The distance that the door 20 travels before stopping is given by the area 299 under the dynamic braking curve 290.

In another aspect, the present invention provides a method of braking a power door 20 which is moved by an electric motor 76 driven by an H-bridge amplifier 220. Such H-bridge amplifier 220 includes four switches 221, 222, 223 and 224 which are connected to the motor 76. The method consists of communicating control signals to control terminals 231 and 232 of two of the switches 221 and 222 having electrical connection to each other and to the terminals 261 and 262 of the motor 76 to provide a current return path, generally designated 270, to allow a braking current through the motor 76 driven by an emf of the motor 76 and hence dynamically braking such motor 76.

Current return path 270 consists of first switch 221, second switch 222 and motor 76. In a presently preferred embodiment of the invention, the method includes the step of generating the control signals as pulses sequentially disposed in time. The width of these pulses is, preferably, modulated to control a time average of the current through motor 76 and these pulses are modulated to limit the time average of the current through the motor 76 to a predetermined current value.

In an alternative embodiment of the invention, a motor having more than two terminals may be employed. In particular, a brushless DC motor having three terminals may be employed using the circuit illustrated in FIG. 6. Electric motor 360, having terminals 361, 362 and 363, is powered by door drive amplifier 320. Door drive amplifier 320 has a first group of switches 380 consisting of switches 321, 322 and 323 which connect the motor terminals 361, 362 and 363 to a first power line 201 having a first voltage. Amplifier 320, also, has a second group of switches 390 consisting of switches 324, 325 and 326 which connect motor terminals 361, 362 and 363 to a second power line 202 having a second voltage.

Figure 6:
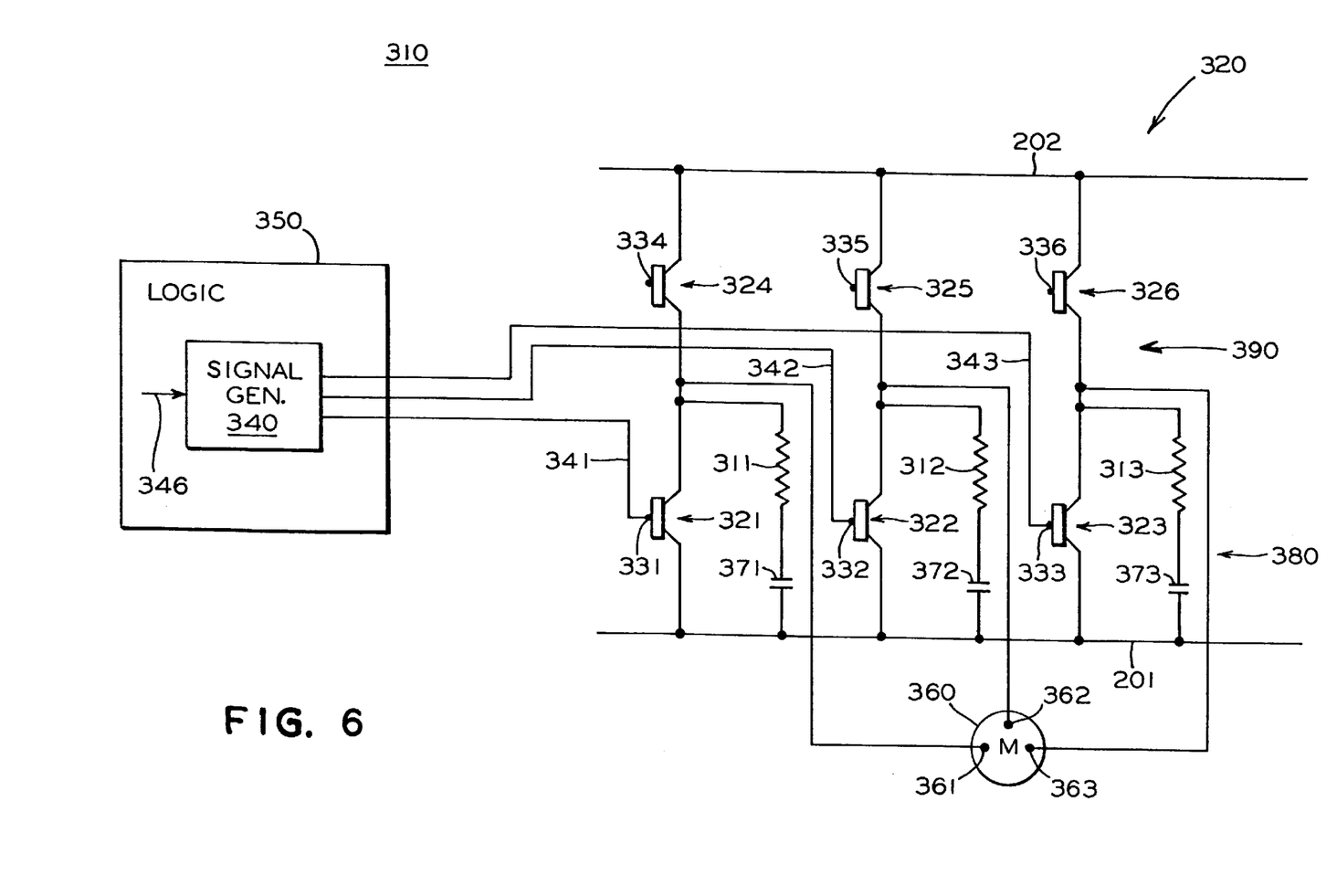
FIG. 6 is an alternate embodiment of the present invention which provides dynamic braking for a power door having a brushless DC motor.

In the door drive amplifier 320 to which this alternate embodiment of the invention is adapted, first switch 321 includes first switch control terminal 331, second switch 322 includes second switch control terminal 332, third switch 323 includes third switch control terminal 333, fourth switch 324 includes fourth switch control terminal 334, fifth switch 325 includes fifth switch control terminal 335 and sixth switch 326 includes sixth switch control terminal 336. Control terminals 231, 232, 233, 234, 325 and 326 have signal connections (not shown) to a motor control signal generator (not shown) for causing a torque in motor 360 in either direction to open or close door 20.

Dynamic brake 310 has a brake control signal generator, generally designated 340, which preferably is disposed within a complex programmable logical device, generally designated 350. The brake control signal generator 340 includes an input signal connection 346 for receiving an input signal that is indicative of a need to apply the dynamic brake 310. The brake control signal generator 340 has at least one output signal line, preferably, output signal lines 341, 342 and 343 having a signal connection to control terminal 331 of the first switch 321, control terminal 332 of the second switch 322 and control terminal 333 of the third switch 323.

The brake control signal generator 340 responds to the input signal on line 346 by supplying at least one control signal to at least two of the control terminals 331, 332 and 333. Preferably, brake control signals are supplied on lines 341, 342 and 343 to control inputs 331, 332 or 333. Control signals applied to two or more control terminals 331, 332 and 333 cause two or more of the switches 321, 322 and 323 to conduct and provide at least one dynamic brake current return circuit for at least one dynamic braking current driven by an emf of motor 360 and hence damping motor 360.

In the preferred case, control signals are applied to all three control terminals 331, 332 and 333 to provide three braking currents between terminals 361, 362 and 363. To limit voltage spikes caused by interruption of currents through motor 360, it is presently preferred that a capacitor 371 and resistor 311 be placed in parallel with switch 321. Likewise, it is presently preferred that a capacitor 372 and resistor 312 be placed in parallel with the switch 322 and that capacitor 373 and resistor 313 be placed in parallel with the switch 323. It is further preferred that the control signals applied to terminals 331, 332 and/or 333 be pulse width modulated to limit an average value of the braking current through motor 360.

While a presently preferred and various additional alternative embodiments of the instant invention have been described in detail above in accordance the patent statutes, it should be recognized that various other modifications and adaptations of the invention may be made by those persons who are skilled in the relevant art without departing from either the spirit of the invention or the scope of the appended claims.

I claim:

1. A dynamic brake for a power door which is moved by an electric motor, such motor having at least a first motor terminal and a second motor terminal, such motor being energized by a pulse width modulated H-bridge amplifier connected to a first power line having a first voltage and a second power line having a second voltage, such second voltage differing from such first voltage, such H-bridge amplifier including a first switch connecting such first motor terminal to such first power line and a second switch connecting such second motor terminal to such first power line and a third switch connecting such first motor terminal to such second power line and a fourth switch connecting such second motor terminal to such second power line, said dynamic brake comprising:

a brake control signal generator connected to receive an input signal indicative of a need to apply said dynamic brake, said brake control signal generator including at least one output signal line having a signal connection to a control input of such first switch and to a control input of such second switch, said brake control signal generator responding to such input signal indicative of a need to apply said dynamic brake by supplying at least one control signal to such control input of such first switch and to such control input of such second switch so that such at least one control signal causes such first switch to be closed and such second switch to be closed so that such motor is shorted through both such first switch and such second switch, thereby allowing a braking current through such motor driven by an emf of such motor and hence dynamically braking such motor, wherein said at least one control signal consists of pulses which are sequentially disposed in time, said pulses being pulse width modulated to limit a time averaged value of said braking current through said motor to a predetermined current value, said brake control signal generator further including means for communicating said control signals to such first switch and such second switch whenever such power door is closed so that said dynamic brake provides a force opposing opening of such power door; and a first series RC circuit connected in parallel to said first switch and a second series RC circuit connected in parallel to said second switch to prevent voltage spikes due to interruption of said braking current.

2. A dynamic brake, according to claim 1, wherein said brake control signal generator further includes a portion of a complex programmable logical device having signals disposed therein for generating said at least one control signal in response to such signal indicative of a need to apply said dynamic brake.

3. A dynamic brake, according to claim 1, wherein said pulses close said first switch and said second switch whenever said time-averaged value of said braking current is below said predetermined current value.

4. A dynamic brake, according to claim 1, wherein such second voltage of such second power line is positive relative to such first voltage of such first power line.

5. A dynamic brake, according to claim 1, wherein such second voltage of such second power line is negative relative to such first voltage of such first power line.

6. A dynamic brake, according to claim 1, wherein such first switch and such second switch are voltage controlled and said at least one control signal is at least one voltage signal.

7. A dynamic brake, according to claim 6, wherein said at least one voltage signal consists of voltage pulses sequentially disposed in time.

8. A dynamic brake, according to claim 1, wherein such first switch and such second switch are transistors and said at least one control signal is a transistor control signal.

9. A dynamic brake, according to claim 1, wherein such first switch and such second switch are field effect transistors and said at least one control signal is at least one voltage signal.

10. A dynamic brake, according to claim 1, wherein such first switch and such second switch are metal-oxide semiconductor field-effect transistors and said at least one control signal is at least one voltage signal.

11. A dynamic brake, according to claim 10, further including a means for obtaining a current indicating signal from a current indicating terminal on at least one of said metal-oxide semiconductor field-effect transistors and for modulating said pulses to limit a time-averaged value of said braking current to a predetermined current value.

12. A dynamic brake for a power door which is moved by an electric motor, such motor having at least two terminals, such motor being powered by a pulse width modulated door drive amplifier having a first group of switches connecting individual ones of such at least two terminals to a first power line having a first voltage, such pulse width modulated door drive amplifier also having a second group of switches connecting individual ones of such at least two terminals to a second power line having a second voltage, such second voltage differing from such first voltage, said dynamic brake comprising:

a brake control signal generator connected to receive an input signal indicative of a need to apply said dynamic brake, said brake control signal generator having at least one output signal line having signal connection to a control input of at least two of such first group of switches to provide at least one switch control signal to close such at least two of such first group of switches to provide a dynamic brake current circuit for a braking current driven by an emf of such motor and hence dynamically braking such motor, wherein said at least one switch control signal is a pulsed width modulated signal to limit a time averaged value of said dynamic brake current to a predetermined current value;

said brake control signal generator further including means for communicating said control signals to such first switch and such second switch whenever such power door is closed so that said dynamic brake provides a force opposing opening of such power door; and a first series RC circuit connected in parallel to said first switch and a second series RC circuit connected in parallel to said second switch to prevent voltage spikes due to interruption of said braking current.

13. A dynamic brake, according to claim 12, wherein such motor has three terminals and such first group of switches consists of three switches and such second group of switches consists of three switches.

14. A dynamic brake, according to claim 13, wherein said at least one output signal line of said brake control signal generator has signal connections to all three of said first group of switches.

15. A method of braking a power door which is moved by an electric motor driven by an H-bridge amplifier having four switches connected to said motor, said method comprising the following steps:

communicating control signals to control terminals of two of said switches having electrical connection to each other and to terminals of said motor to provide a current return path to allow a braking current through said motor driven by an emf of said motor and hence dynamically braking said motor, wherein said signals are pulse width modulated to limit a time average of said current through said motor to a predetermined current value;

supplying a series resistance-capacitance circuit in parallel with each of said two of said switches to prevent voltage spikes due to interruption of said braking current; and communicating said control signals to said control terminals when said door is closed to prevent opening of said door.

* * * * *